United States Patent [19]

Tam

[11] Patent Number: 5,053,958
[45] Date of Patent: Oct. 1, 1991

[54] METHOD TO REDUCE IMAGE RECONSTRUCTION TIME IN LIMITED-ANGLE CT SYSTEMS INCLUDING USING INITIAL RECONSTRUCTION VALVES FOR MEASURED PROJECTION DATA DURING EACH ITERATION

[75] Inventor: Kwok C. Tam, Schenectady, N.Y.

[73] Assignee: General Electric Company, Schenectady, N.Y.

[21] Appl. No.: 201,784

[22] Filed: Jun. 6, 1988

[51] Int. Cl.$^5$ .............................................. G06F 15/42
[52] U.S. Cl. ........................... 364/413.13; 364/413.19
[58] Field of Search ..................... 364/413.19, 413.13, 364/413.14, 413.20

[56] References Cited

U.S. PATENT DOCUMENTS

| | | | |
|---|---|---|---|
| 4,506,327 | 3/1985 | Tam | 364/414 |
| 4,866,614 | 9/1989 | Tam | 364/413.25 |
| 4,888,693 | 12/1989 | Tam | 364/413.16 |
| 4,922,421 | 5/1990 | Tam | 364/413.25 |

FOREIGN PATENT DOCUMENTS 2192120A  12/1987  United Kingdom .

OTHER PUBLICATIONS

K. C. Tam and V. Perez-Mendez, "Tomographical Imaging with Limited-Angle Input", J. Opt. Soc. Am., 71, May 1981, 582-592.

K. C. Tam and V. Perez-Mendez, "Improved Gated Cardiac Scanning Using Limited-Angle Reconstruction Technique", IEEE Trans. Nucl. Sci., NS-30, Feb. 1983, 681-685.

K. C. Tam, "The Use of Convex Hulls in Limited-Angle Computerized Tomography", TIS Report No. 88CRD006, Feb. 1988, General Electric Co., Corporate Research and Development, P.O. Box 8, Schenectady, NY 12301.

K. C. Tam, "Comparison of Three Methods in Limited-Angle Image Reconstructions", TIS Report No. 87CRD212, Nov. 1987, General Electric Co., Corporate Research and Development, P.O. Box 8, Schenectady, NY 12301.

Primary Examiner—Gail O. Hayes
Attorney, Agent, or Firm—Paul R. Webb, II; James C. Davis, Jr.

[57] ABSTRACT

To achieve a large reduction in the amount of computer time in limited-angle computerized tomography, the reconstructed image is decomposed into two partial images reconstructed from available scan data and missing scan data. Because the former is unchanged during the interative image reconstruction procedure, it is reconstructed from the measured projections only once at the beginning of the iterations and used repeatedly. The composite image formed by summing the two partial images is corrected by the a priori information about the object. The improved partial image due to missing projections is calculated and again summed with the partial image due to measured projections and corrected. These steps are iteratively repeated until a test for convergence yields a final image. A limited-angle x-ray CT system utilizes the projection space version of the iterative transform algorithm.

4 Claims, 5 Drawing Sheets

Microfiche Appendix Included
(1 Microfiche, 11 Pages)

1

METHOD TO REDUCE IMAGE RECONSTRUCTION TIME IN LIMITED-ANGLE CT SYSTEMS INCLUDING USING INITIAL RECONSTRUCTION VALVES FOR MEASURED PROJECTION DATA DURING EACH ITERATION

This application contains a microfiche appendix, designated Appendix A, listing a limited-angle image reconstruction program. Standard computerized tomography subroutines are not included in the listing. The total number of microfiche is 1 and the total number of frames is 11.

BACKGROUND OF THE INVENTION

This invention relates to limited-angle imaging and especially to reducing the amount of computation time to reconstruct an image using iterative algorithms.

In some situations in industrial x-ray CT (computerized tomography) complete projection data of the object are not available. Projection data in some angular range could be missing due to reasons such as too much attenuation or physical inaccessibility; these situations are depicted in U.S. Pat. No. 4,506,327. An iterative method to reconstruct the object under such circumstances have been reported in that patent and the inventor's other copending patent applications and in published papers authored by the inventor and V. Perez-Mendez; the procedure is shown in FIGS. 1 and 2. The iteration algorithm fills in the missing scan data by utilizing the a priori information on the object. The reconstructed image is transformed back and forth between the object space and the projection space, being corrected in the object space by the a priori information about the object, and in the projection space by the measured projection data. The results in the published papers demonstrated that the iteration algorithm indeed brought about significant improvement in limited-angle imaging.

Typically it takes about 5 to 10 iterations for the reconstructed image to converge. In each iteration the major part of the computer time is spent in the filtered backprojection and the projection operations. Since the projection operation needs to be performed only in the missing views, the computer time on the projection operation will be much smaller than on the filtered backprojection operation if the number of missing views is a small fraction of the total number of views. This condition is usually fulfilled in industrial x-ray CT. Thus the total computer time T to reconstruct the image using the iterative algorithm in FIG. 2 is roughly equal to the number of iterations n times the computer time t for a filtered backprojection operation: $T \approx nt$. Since filtered backprojection is the algorithm for reconstructing images in complete-angle x-ray CT, this equation says that the computer time for limited-angle reconstruction is about 5 to 10 times that for complete-angle reconstruction.

SUMMARY OF THE INVENTION

An object of the invention is to develop a method which achieves a significant reduction in the computations needed to reconstruct images of an object in limited-angle CT.

Another object is to reduce by a large factor the computer time for limited-angle CT and x-ray CT when the number of missing views is small compared to the total number of views.

This invention recognizes that the reconstruction procedure is such that the interim image reconstructed using the prior art iterative algorithm can be considered to be composed of two partial images, one reconstructed from the measured projection data and one from the missing projections. Because the former remains unchanged during the iterations, it can be reconstructed only once at the beginning of the iterations and used over and over during the iterations.

A method of forming an image of an object by the improved limited-angle reconstruction procedure has the following steps. The object is scanned with an imaging agent over a limited angular range and measured projections are generated at available view angles. A measured data partial image is reconstructed from the measured projections; this may be done by filtered backprojection, which is a linear operation. A composite image of the object is produced by summing the measured data partial image with a calculated data partial image that is reconstructed from the missing projections; the latter are initially set to zero. The composite image is corrected using a priori information about the object by 1) setting to zero any image pixels outside the known boundary of the object, 2) resetting to a pre-chosen upper bound any pixels with density exceeding the upper bound, and 3) resetting to zero any pixel with negative density. The missing projections at the missing view angles are calculated from the interim, corrected composite image. The next step is reconstructing an improved calculated data partial image due to the missing projections just calculated; this may be a filtered backprojection operation. The last four steps are iteratively repeated, beginning with summing the two partial images, to progressively improve the composite image using the same measured data partial image and the successively improved calculated data partial image until sufficient image quality is attained.

As the ratio of the number of missing views to the total number of views decreases, and assuming that the computer time for filtered backprojection is about the same as for projection, the savings in computer time increases.

Another feature of the invention, particularly limited-angle x-ray CT, is that the a priori information about the object may include the exterior boundary of the object which is approximated by the convex hull of the object constructed from the measured projections.

DETAILED DESCRIPTION OF THE INVENTION

Figure 1:
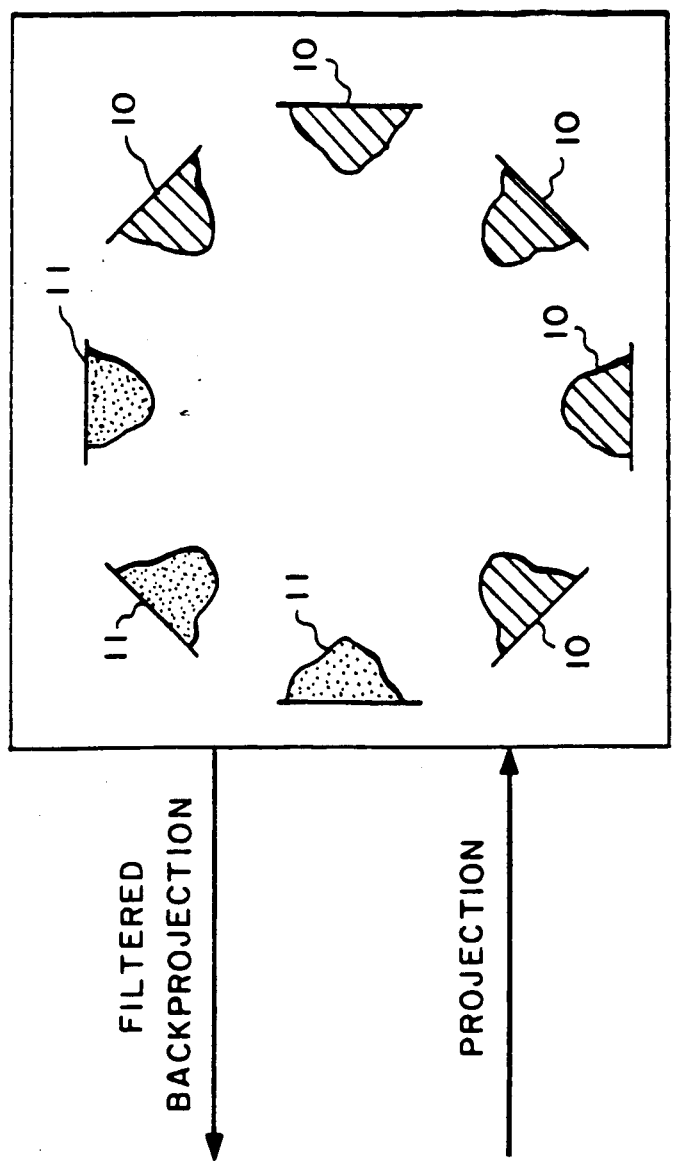
FIG. 1 illustrates diagrammatically the projection space version of a prior art iterative transform algorithm to reconstruct an object from limited-angle data.

When an object is scanned with x-rays over a limited angular range, the x-ray detector signals represent the projections of the object in the limited angular range. In FIG. 1, the measured projections 10 at five available view angles are illustrated, and the missing projections 11 at three missing view angles are filled in by an iteration algorithm using the exterior boundary of the object, which is known, and other a priori information about the object. The missing projections are initially set to zero and the object is reconstructed by a filtered backprojection operation. After correcting the object density, which corresponds to the gray level in the reconstructed image, the missing projections are calculated from the reconstructed object by a projection operation. The prior art image reconstruction procedure is given more completely in the flowchart, FIG. 2. Referring to steps 13-15, the measured projections in a limited angular range are acquired. A complete set of projections of the object is comprised of these measured projections plus the missing projections at inaccessible view angles which are set to zero initially. The object density is reconstructed by filtered backprojection. The initial estimate of object density, steps 16 and 17, is corrected by the a priori information on the object, namely the extent and location of the object, the known upper bound of object density, and that there is no negative density. The image of the object is corrected, pixel by pixel, by resetting to zero those pixels outside the known extent of the object, resetting to the upper bound those pixels with density exceeding the upper bound, and resetting to zero those pixels with negative density. After a test for convergence of the data is made, steps 18 and 19, the missing projections of the interim object density in the missing views are calculated.

A second iteration begins and the first estimate of the missing projections are now provided as well as the measured projections. A filtered backprojection operation is done on the whole set of projections in order to reconstruct the object. The object density is corrected by the a priori information, the second estimate of the missing projections is calculated, and so on. Typically the reconstructed image of the object converges after about 5 to 10 iterations and a final reconstructed project density or reconstructed image, step 20, is output.

Figure 2:
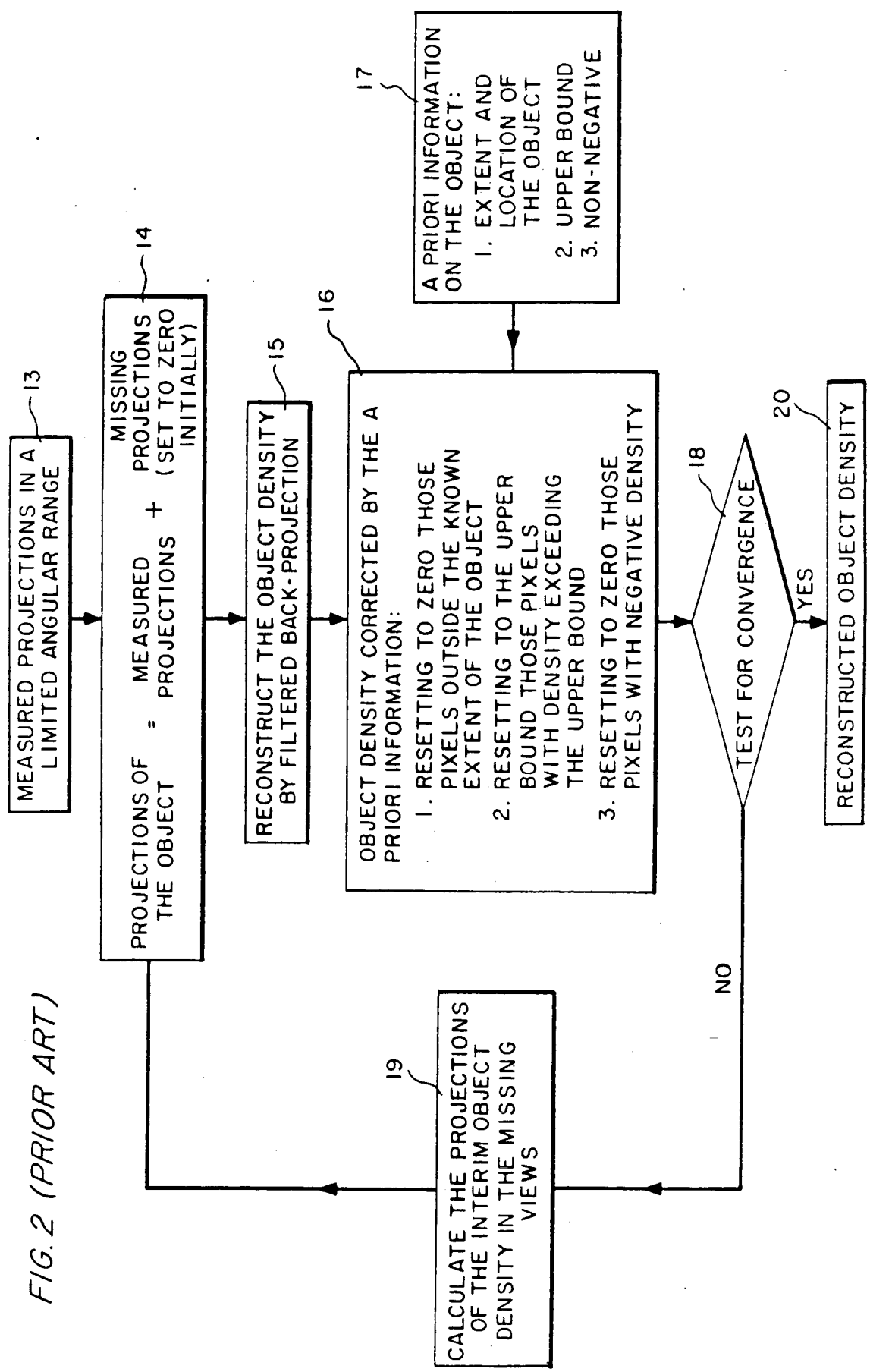
FIG. 2 is a flowchart of the prior art limited-angle image reconstruction procedure in FIG. 1.
Figure 3:
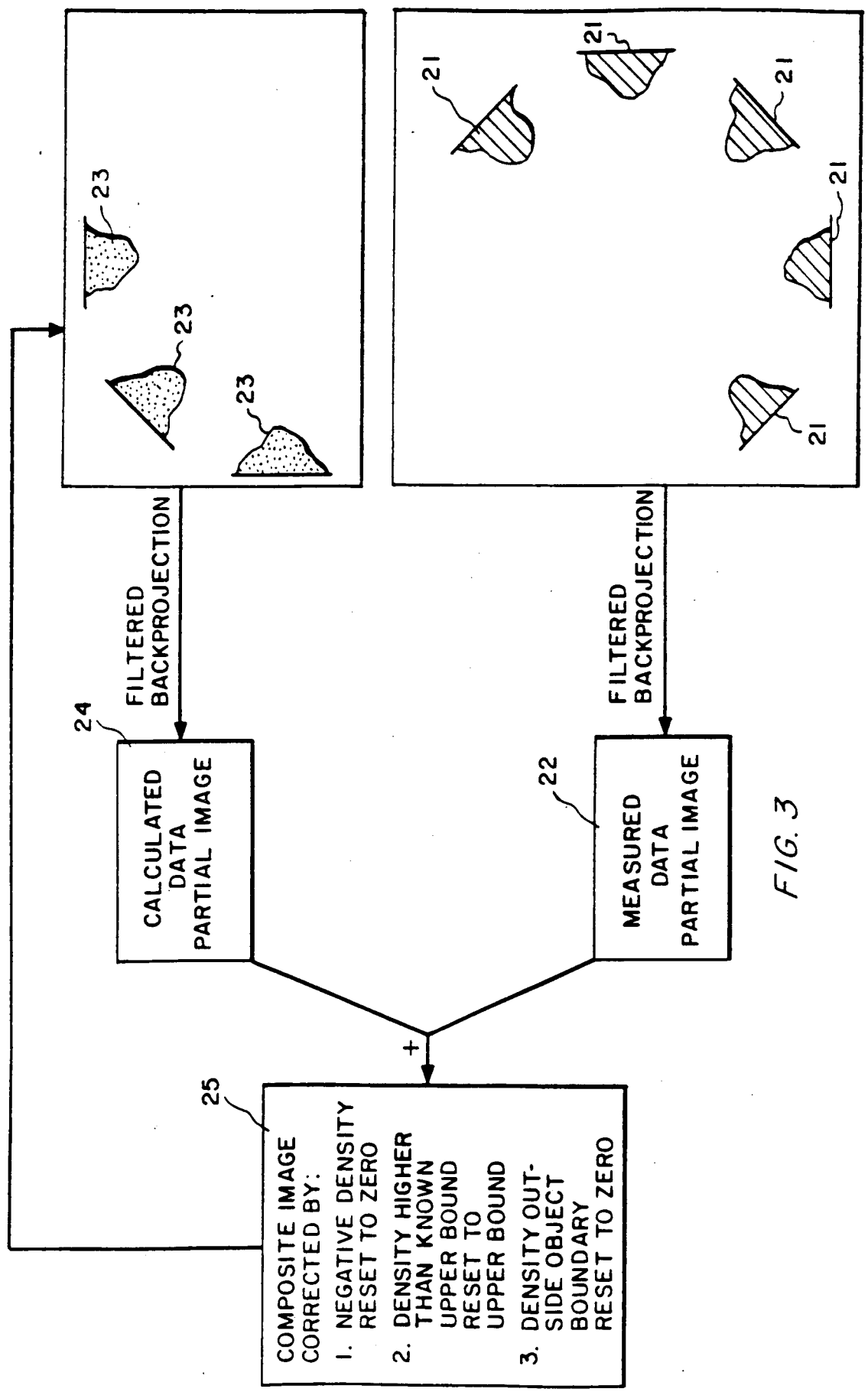
FIG. 3 shows diagrammatically the modified iterative procedure of this invention which decomposes the reconstructed image into two partial images reconstructed from available and missing scan data, respectively.

The modified iterative transform in FIG. 3 significantly reduces the image reconstruction time in limited-angle CT. Since filtered backprojection is a linear operation, the interim images reconstructed at 15 using the iterations in FIG. 2 can be considered to be composed of two partial images: one reconstructed from the measured projection data and one from the missing projections Because the former remains unchanged during the iterations, it only needs to be reconstructed once at the beginning of the iterations and used over and over again during the iterations. This modification leads to substantial savings in computer time if the number of views containing data is large compared to the number of missing views, at the expense of extra storage for the measured projection data partial image.

After acquiring the measured projections 21, a measured data partial image 22 due to the measured projections is reconstructed by a filtered backprojection operation. This is the only time this is done; this procedure is not in the iteration loop. The missing projections 23 are initially set to zero and thereafter calculated from the corrected composite image. A calculated data partial image 24 due to the missing projections is reconstructed by filtered backprojection. The two partial images 22 and 24 are summed to produce an interim composite image 25 which is corrected in the same manner as before, using a priori information about the object. This is a nonlinear operation and corrections are made to the composite image rather than to the partial images. The missing projections at the missing view angles are calculated from the interim corrected composite image using a projection operation. An improved calculated data partial image 24 is computed a second time by filtered backprojection and summed with the stored measured data partial image 22. The interim composite image 25 is progressively improved as the iteration process proceeds until sufficient image quality is attained.

Figure 4:
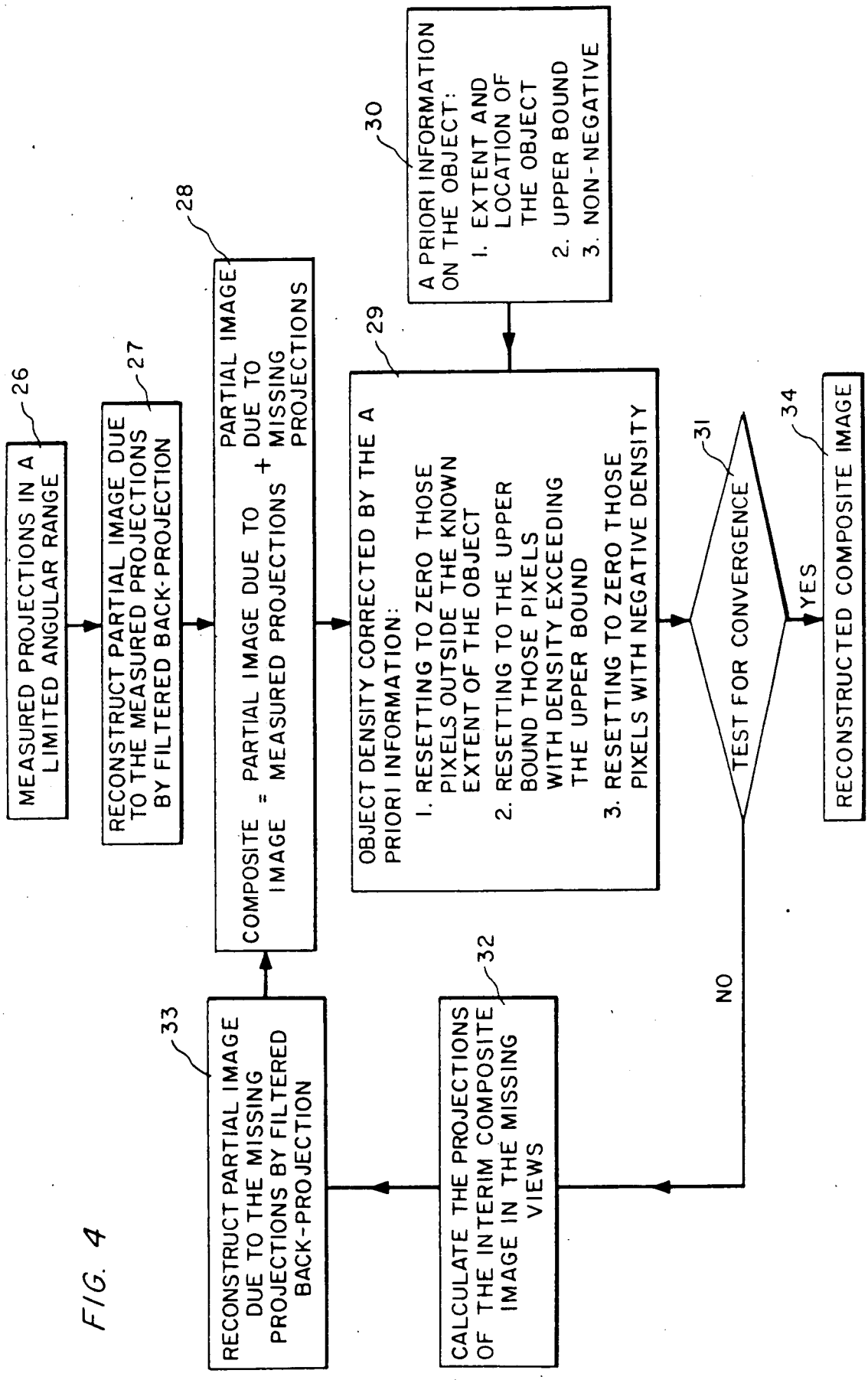
FIG. 4 is a flowchart of the more efficient limited-angle image reconstruction procedure of FIG. 3.

FIG. 4 is a flowchart of the projection space version of the modified and improved iterative transform. Steps 26 and 27 are that the object is scanned with x-rays at the accessible view angles and measured projections in the limited angular range are acquired. The measured data partial image due to the measured projections is reconstructed by filtered backprojection. The composite image, step 28, is formed by combining the partial image due to measured projections and a partial image due to the missing projections. The composite image, steps 29 and 30, is corrected by the listed a priori information on the object by: 1) resetting to zero those pixels outside the known extent and exterior 25 boundary of the object, 2) resetting to the upper bound those pixels with density exceeding the upper bound, and 3) resetting to zero those pixels with negative density.

If a test for convergence is not satisfied at 31, the next steps 32 and 33 are to calculate the missing projections of the interim composite image and object density in the missing views, and reconstruct another calculated data partial image using the missing projections just calculated and a filtered backprojection operation. The composite image at 28 is progressively improved as steps 29 and 31-33 are iteratively repeated using the same measured data partial image and the successively improved calculated data partial image due to the missing projections. Upon satisfying the test for convergence at 31, a final reconstructed composite image is output at 34.

Figure 5:
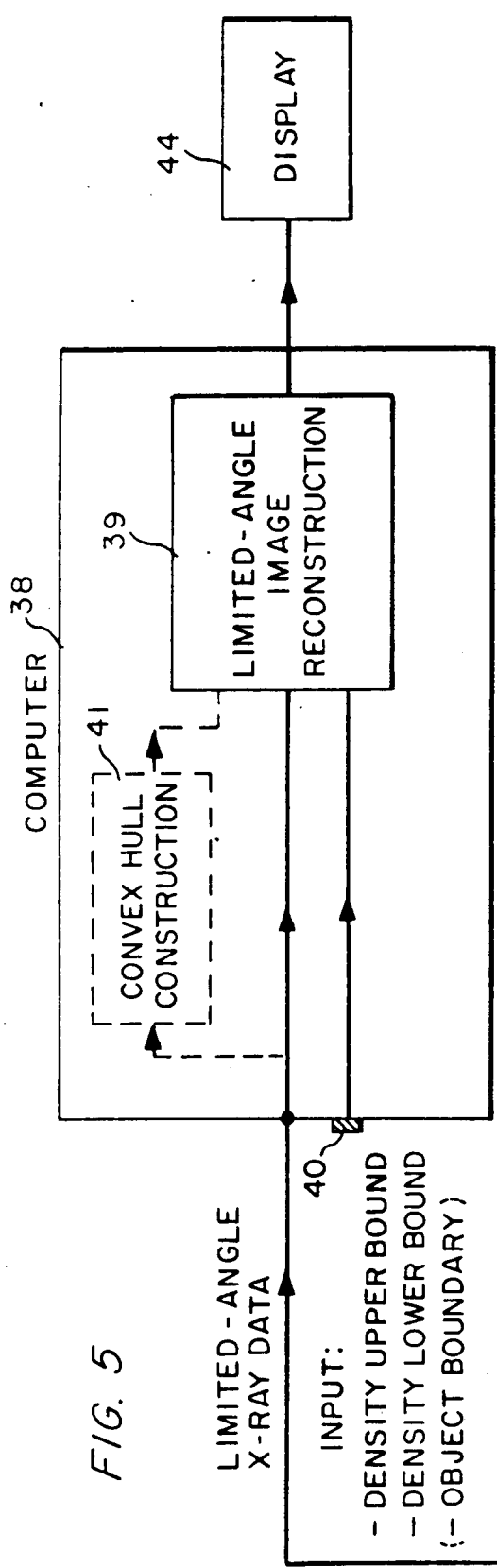
FIG. 5 is a system diagram of an industrial x-ray computerized tomography system.

FIG. 5 shows a limited angle x-ray CT system and one practical realization of the invention. An x-ray source 35 scans the object 36 in a limited angular range; the x-ray photons that penetrate the object are detected by an array of x-ray detectors 37. Scanning can be carried out either in parallel beam geometry or fan beam geometry, and the latter is illustrated. The detected signals, which represent the projections of the object in the limited angular range, are fed into a computer 38. The limited-angle measured x-ray data are input to the limited-angle image reconstruction algorithms 39. At the other input 40 of the computer there is presented the a priori information on the object, viz. the exterior boundary of the object, the upper bound and the lower bound (usually zero) of its density. The upper and lower bounds of the object density can be estimated from the chemical composition of the object. The exterior boundary can be obtained by probing, either mechanical or optical, or it can be approximated by the convex hull of the object constructed from the x-ray data, as shown at 41, using the techniques described in the inventor's copending U.S. application Ser. No. 032,804, filed Apr. 1, 1987. Another reference is General Electric TIS Technical Report No. 88CRD006, February 1988, "The Use of Convex Hulls in Limited-Angle Computerized Tomography".

Figure 6:
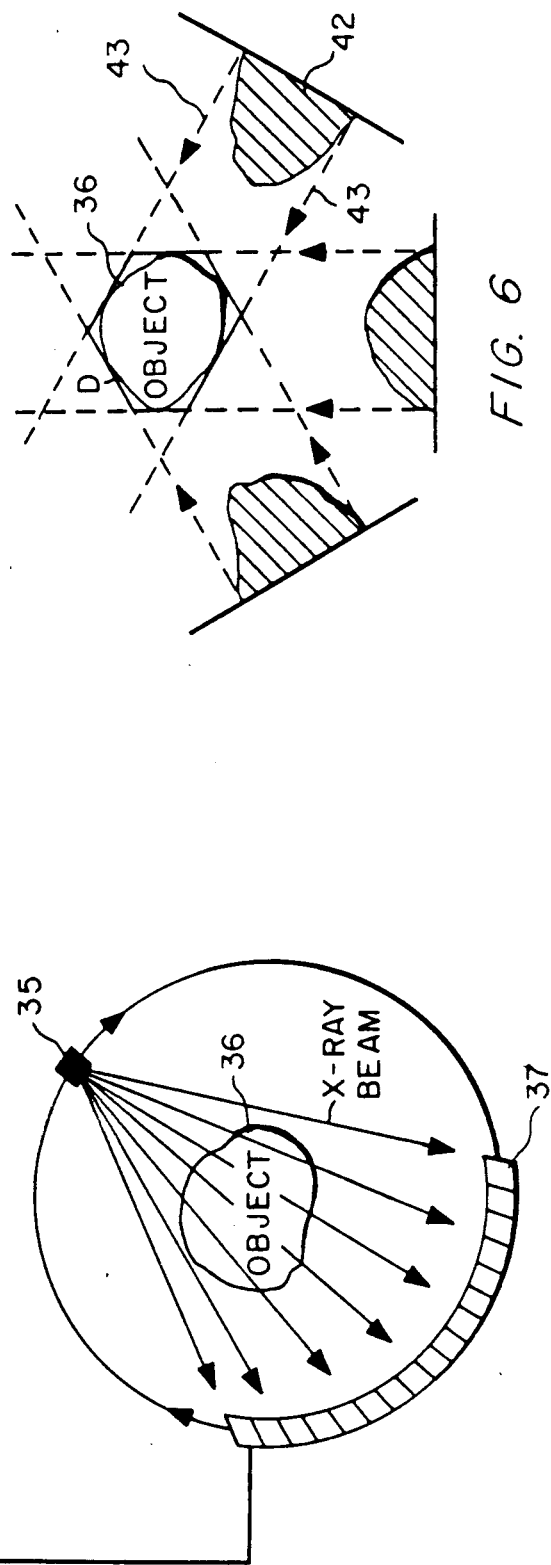
FIG. 6 illustrates constructing the convex hull of an object from the measured projection data.

FIG. 6 shows the principle of constructing the convex hull from the measured projections. If the backprojection of a measured projection 42 is bounded by the dashed lines 43, it can be shown that the object's support is completely contained within the non-zero portion of the backprojection. When a region D is constructed by intersecting all of the backprojections (only 3 are shown) the object 36 is contained entirely within the region D. D is a polygon containing the object, and as the number of view angles increases, D approaches the boundary of the object if the boundary is convex. If the boundary is not convex, D approaches the convex hull of the boundary.

Using the a priori information supplied and the limited-angle scan data, the object and its composite image is reconstructed by means of the limited-angle reconstruction algorithm in FIG. 4. Upon satisfying the convergence test, the reconstructed composite image of the object is displayed at 44, FIG. 5.

The invention cuts down by a large factor the computer time for limited-angle CT and x-ray CT when the number of missing views is small compared to the total number of views. Assuming that the computer time for filtered backprojection is about the same as that for projection, the total computer time (in arbitrary units) for image reconstruction using the modified transformed algorithm in FIG. 4 is tabulated in the following table as a function of the number n of iterations and of the ratio r = number of missing views/total number of views. The corresponding computer time using the prior art algorithm in FIG. 2 is shown in parenthesis for comparison. It can be seen that with the new algorithm limited-angle CT becomes much more desirable as far as computer time is concerned.

TABLE 1

| n/r | 0.05 | 0.10 | 0.20 |
|---|---|---|---|
| 5 | 1.5(11) | 2.0(11) | 3.0(11) |
| 10 | 2.0(21) | 3.0(21) | 5.0(21) |
| 20 | 3.0(41) | 5.0(41) | 9.0(41) |

General Electric TIS Technical Report No. 87CRD212, November 1987, "Comparison of Three Methods in Limited-Angle Image Reconstructions", reviews three image reconstruction algorithms, namely the ART (algebraic reconstruction techniques), the maximum entrophy, and the iterative transform algorithm of this invention. It is concluded that the iterative transform algorithm offers the best combination of image quality, noise stability and computing time for limited-angle reconstructions.

The invention can be applied to other imaging modalties and CT systems. The electron microscope has a restricted angle of coverage and uses the same reconstruction methods. An ultrasound limited-angle CT system is used in the characterization of flaws.

Microfiche Appendix A contains a limited-angle image reconstruction program listing but does not include standard CT subroutines such as projection, convolution and backprojection which may be taken from the Donner Algorithms for Reconstruction Tomography, R. H. Huesman et al, 1977, Lawrence Berkeley Laboratory, University of California, Berkeley.

While the invention has been particularly shown and described with reference to preferred embodiments thereof, it will be understood by those skilled in the art that the foregoing and other changes in form and details may be made without departing from the spirit and scope of the invention as defined in the appended claims.

The invention claimed is:

1. A method of forming an image of an object in a x-ray computerized tomography system using an improved limited-angle image reconstruction procedure, comprising the steps of:
   a) scanning said object with x-rays over a limited angular range and acquiring measured projections at available view angles;
   b) reconstructing a measured data partial image from said measured projections by a filtered backprojection operation;
   c) producing a composite image of said object by summing said measured data partial image and a calculated data partial image which is reconstructed from missing projections at missing view angles that are initially set to zero;
   d) correcting object density in said composite image with a priori information about said object by 1) setting to zero any image pixels outside a known boundary of said object, 2) resetting to a prechosen upper bound any pixels with density exceeding the upper bound, and 3) resetting to zero any pixels with negative density;
   e) calculating the missing projections from an interim corrected composite image by a projection operation;
   f) reconstructing an improved calculated data partial image by a filtered backprojection operation from the missing projections calculated in the preceding step; and
   g) iteratively repeating steps c to f and progressively improving said composite image using the same measured data partial image and the successively improved calculated data partial image.

2. The method of claim 1 wherein said correcting object density in step d(1) comprises determining said object boundary by approximating a convex hull of said object constructed from said measured projections.

3. The method of claim 1 further comprising testing the interim corrected composite image for convergence and outputting a final reconstructed image.

4. The method of claim 3 further comprising displaying said final image.

* * * * *